(12) United States Patent
Davignon et al.

(10) Patent No.: US 7,409,248 B2
(45) Date of Patent: Aug. 5, 2008

(54) LAYER BASED PAINT OPERATIONS

(75) Inventors: Marc-Andre Davignon, Montreal (CA); Martin Helie, Laval (CA)

(73) Assignee: Autodesk Canada Co., Montreal, Quebec (CA)

(*) Notice: Subject to any disclaimer, the term of this patent is extended or adjusted under 35 U.S.C. 154(b) by 320 days.

(21) Appl. No.: 11/107,434

(22) Filed: Apr. 15, 2005

(65) Prior Publication Data

US 2006/0232607 A1 Oct. 19, 2006

(51) Int. Cl.
*G05B 15/00* (2006.01)
*G09G 5/00* (2006.01)
*G06T 11/20* (2006.01)
*G06F 3/048* (2006.01)

(52) U.S. Cl. .......... 700/83; 345/441; 345/582; 345/629; 715/780; 715/790

(58) Field of Classification Search .......... 700/83; 345/629; 715/780, 790
See application file for complete search history.

(56) References Cited

U.S. PATENT DOCUMENTS

| | | | | |
|---|---|---|---|---|
| 5,982,350 A | * | 11/1999 | Hekmatpour et al. | 345/629 |
| 5,999,190 A | * | 12/1999 | Sheasby et al. | 345/589 |
| 6,031,529 A | * | 2/2000 | Migos et al. | 715/783 |
| 6,891,550 B1 | * | 5/2005 | Nolan | 345/619 |
| 7,106,343 B1 | * | 9/2006 | Hickman | 345/589 |
| 2005/0035790 A1 | * | 2/2005 | Devendorf et al. | 327/77 |

OTHER PUBLICATIONS

Chu et al., "Real-Time Painting with an Expressive Virtual Chinese brush" Sep./Oct. 2004 IEEE 76-85.*
Baxter et al., "DAB: Interactive Haptic Painting with 3D Virtual brushes" 2001 ACM pp. 461-468.*

* cited by examiner

*Primary Examiner*—Albert Decady
*Assistant Examiner*—Thomas H Stevens
(74) *Attorney, Agent, or Firm*—Gates & Cooper LLP

(57) ABSTRACT

A method, apparatus, and article of manufacture provide the ability to conduct a paint operation in a procedural renderer and a reveal paint operation while dynamically selecting multiple layers. For the procedural renderer based paint operation, a schematic view of a flow of clip image data is displayed having nodes and lines connecting the nodes. Within the schematic view, a layer node is obtained utilized to perform a paint operation without processing the operators associated with each node in the schematic view. For the reveal paint operation, a paint application obtains a composite having multiple layers. The paint application dynamically identifies one or more of the multiple layers to be used in a reveal operation. Once identified, the reveal paint operation is performed wherein a reveal tool is used to reveal contents of the one or more identified layers at a position where the reveal tool is used.

24 Claims, 6 Drawing Sheets

LAYER BASED PAINT OPERATIONS

BACKGROUND OF THE INVENTION

1. Field of the Invention

The present invention relates generally to image/video display and processing systems, and in particular, to a method, apparatus, and article of manufacture for conducting paint operations in a procedural renderer and revealing elements in a paint buffer.

2. Description of the Related Art

In a multi-layer context (e.g., a compositing application), a user may paint (e.g., a brush stroke) on any particular layer. However, if a paint operation contains multiple different elements, the prior art requires the creation of a result clip prior to being used in a composite. In addition, if the user is editing a clip in a procedural tree, the prior art does not permit the user to directly edit a paint operation. Instead, the prior art requires the user to exit the procedural tree, utilize a paint application, perform the edit, save any changes, and re-enter the procedural tree again. Such limitations are inefficient and inflexible. These problems may be better understood by describing prior art composites, paint operations, and reveal operations.

In a compositing application, multiple layers of footage are blended together into a single composite. For example, using a stage theater as an analogy, a user may start with a backdrop, and then add the scenery layer by layer, from back to front, until the scene is cohesive and complete. Accordingly, a layer is a 2D object that can be arranged and animated in 3D space.

To edit a layer or to create particular images on a layer, a paint application may be used. In audio/video applications, a paint application enables the user to perform a wide range of painting tasks from simple retouching, to motion tracking, to full cartoon animation. Accordingly, a paint application is an interactive vector-based and object-oriented drawing operator. In paint applications, a user may create projects for painting on changing video frames (and not on a still). Accordingly, the paint object must move and follow the action in a scene. In addition, a paint operator may be applied to a particular layer (or group of layers).

Within a paint application, an object consists of anything that may be drawn with a paint drawing operator. Objects may be divided into three main groups: paint, selection, and mask. Paint objects create or modify pixels. Selection objects define a specific area of the screen within which other paint objects or effects operate. Mask objects make areas of a layer transparent. Thus, after an object is created, the object may be selected and its properties (e.g., size, shape, color, opacity, etc.) may be changed. Examples of objects that may be created in a paint application include: brush strokes, rectangles, ellipses, and polygons; text; lasso selections; magic wand selections; rectangular, elliptical, and polygon selections; text selections, fill; freehand masks; and rectangular, elliptical, and polygon masks.

The stacking order refers to the placement of the objects in a stack. Objects at the bottom of a stack are covered by objects at the top of the stack. Selections may act on objects above them in the stacking order until another selection is encountered. Thus, if a selection is created on top of an existing selection, the new selection becomes the active selection and paint operators only apply to the active selection.

A mask may be used to isolate a region of an image, and make the rest of the image completely transparent. The mask affects the image's alpha channel, which is where the transparency information is stored. A mask may be used to create an alpha channel, or to add to an existing alpha channel. Objects below a mask in the stacking order are transparent; objects above the mask in the stacking order may or may not be transparent depending on their own alpha information. For example, referring to FIG. 1, if an ellipse 102 is drawn (on top of a mask 104) without an alpha channel (e.g., only RGB), then the shape will not change the layer's transparency and therefore will not be visible outside the mask 104. Thus, the area of ellipse 102 outside of the mask 104 is completely transparent. If an ellipse is drawn with RGB and its own alpha channels (RGBA) 106, then the shape 106 "overwrites" the mask's 104 alpha information, and the ellipse 106 is visible outside of the mask 104. To isolate a region of an image without affecting the transparency, a selection should be utilized instead of a mask. When an operator (e.g., a color corrector) is applied above the selection, only the isolated area is affected and the rest of the image is still visible.

As described above, alpha channels are used to determine how much of a front image shows over a back image. For example, if the user is looking through a keyhole inside a room, the door is the front, the keyhole is the alpha, and the room is the back. Combined together, the layers form a composite. If the contents of the alpha channel are rendered, the result is referred to as a matte or matte layer. A matte can be completely black and white (called a "hi-con" for high-contrast), or can contain many shades of gray. In video and film, mattes are rarely static, and are rarely pure black and white. Any areas on the front containing transparency (e.g., glass, smoke, curly blonde hair, etc.) or motion blur will appear in the matte as gray areas, allowing the transparent (or blurred) areas to partially show through.

As described above, a paint application may be used in conjunction with a composite to paint on one layer or over several layers at a time. For instance, a paint application may be used to change a subject's eye color, remove wires, fix video drop-out on a selected layer, or create text effects and cartoon animations that are added over all of the layers in a composite. In addition, prior art paint applications include both vector paint application (that define strokes as objects) and raster paint applications (that modify pixels in the image directly or write pixels directly in separate layers that may be combined in a source image thereby modifying the source image).

Paint operators are like any other operator in that they may be viewed schematically on a per-layer basis. FIG. 2 illustrates a process tree in a schematic view. A schematic view 200 uses nodes 202-214 to represent all of the operators in a workspace performed on a particular layer, and lines (edges) 216 between nodes 202-214 to indicate the flow of image data between the operators. The output of one node 202-214 is the source for the next node 202-214. As composites 212 or other branches (e.g., paint or color correction projects) are created, a process tree indicating the flow of data through the nodes 202-214 is built automatically. As illustrated in FIG. 2, source data consists of gator node 202 and snake node 204. A paint operation (e.g., via paint node 206) is performed on gator node 202 (e.g., by drawing the sun). The connection nodes 208-210 are then used as input to the composite operator node 212 which performs a compositing operation. The compositing operation node 212 produces a result/output 214.

In addition, prior art paint modules in procedural renderers (i.e., conducted in a schematic view) are raster paint nodes that do not have layers and modify their input buffers directly. In this regard, an input buffer in an procedural renderer may come from a fairly complex process tree and modifications to that tree will re-create the input buffer. A side-effect of these modifications is that the paint strokes, being applied directly to the input buffer, are lost when that input gets modified through a change in the nodes upstream of a paint node.

As used herein, an operator (e.g., paint operator 206) is the most common node. A connection node 208 and 210 represents an input for an operator. In the case of a composite operator 212, the visible connection nodes 208 and 210 are layers. The output node 214 is a node representing the render queue settings for an operator. Lastly, several nodes may be grouped into a group node.

The process tree (such as the process tree illustrated in FIG. 2) can be used to manage operators and nodes. For example, users may add operators (e.g., a paint operation) to a branch, change the process order of operators 206, and navigate easily between operator controls. Further, if an operator is added to a layer in a schematic view 200, the operator will appear as a node (e.g., the paint node 206). The same operator node may also appear in other workspace environments (e.g., a workspace panel). Further, in the schematic view, particular operators may be turned on/off as desired simply by clicking on the icon for that operator (e.g., paint 206 or composition 212).

While the above prior art schematic view and paint operations may be used to modify and edit an image/clip, the prior art has many limitations. For example, in some prior art applications, a paint operator 206 is associated with a particular version of a source image 202. Thus, if a source image (e.g., image 202) is edited, the paint operator 206 disappears and all information associated with the paint node 206 is lost. In addition, prior art paint operations cannot be performed from within the schematic view 200. Thus, in order to perform any modifications using a paint operation, the prior art requires the user to exit the schematic view, enter the paint application, perform the desired paint operation, produce a result clip, reenter the schematic view 200, import the result clip into the schematic view 200 and continue.

Prior art applications may also provide for the use of a reveal tool. Revealing is similar to using an eraser on one layer, allowing the user to see what is beneath it. Typically, the reveal tool is used for adding or removing objects from a scene (also referred to as rotoscoping) (e.g., scratches, wires, or a microphone boom). Phrased in another manner, the reveal tool allows the user to use a paint operator on a current frame and reveal an image from a designated source frame/clip (i.e., the user is revealing, via the paint operation, to another layer/source). The prior art reveal tools may be used in two ways: to reveal from a frame in the current clip; or to reveal from a frame in another clip.

A user may reveal to the current frame as a fast mechanism for copying or removing objects in the current frame. For instance, a user can perform a quick wire removal of an object in front of a green screen by revealing to the current layer with a slight position offset. When the user paints over the wires (using a paint operator), the user sees through to the green screen. For a uniformly lit green screen, the user can no longer distinguish where the wires were. Thus, there are various settings for a reveal operation.

FIG. 3 illustrates a dialog window indicating the various settings for a reveal operation. Within the modes controls 302 on the paint controls panel 300, the user has selected Reveal 304. The Object property 306 allows the user to select a paint tool in the form of a particular shape (e.g., a rectangle, brush stroke, etc.) as well as whether the object is filled (e.g., a filled rectangle). The channels property 308 allows for the selection of an item in a list to draw on a single color channel. When the user switches channels, the viewport may update to display the specified color or alpha channel(s) for the selected object (s). Thus, if the blue channel is selected from the channel list 308, only shades of blue may be available on different panels, and only the blue portion of the selected object's color is displayed in the viewport. In FIG. 3, RGBA has been selected.

With RGBA selected, all of the colors (red, green, blue) and the opacity (alpha) will be available on different panels and will be displayed in a viewport.

The source property 310 allows the user to pick the layer to use as the reveal source. If "current" is selected, the footage currently loaded into the paint application is used as the source. A pick operator may be used to access a dialog that allows the user to choose another operator (e.g., from the process tree of FIG. 2) as the reveal source. From the dialog, the user can import footage from disk for use as a reveal source or select an operator corresponding to the image or clip the user desires to use as the reveal source.

The frame property 312 allows the user to enter a frame number corresponding to the frame to use from within the source specified in source property 310. In addition, the user may elect to lock 314 the reveal source. If lock 314 is enabled, the reveal operation only reveals to the frame specified in the frame field. If the user desires the reveal source to advance and reverse frames as the user moves through the clip, the lock 314 should be disabled. Because the reveal operation reveals to the pixels that are directly underneath, the user may want to adjust the position of the reveal source with respect to the target layer. To position the reveal source, the user can click and drag the set position button (i.e., the "+") to position the source layer. Alternatively, the user can enter X and Y offset values in the corresponding fields.

An example of the use of the offset field 316 is when the user desires to remove wires (e.g., used to hang a model airplane for a flight scene). To accomplish such removal, the user would specify the current layer as the reveal source 310 and offset the frame slightly so that when the user paints over the wires, the adjacent pixels are revealed on the target image.

Another example of the use of the reveal operation is if the user desires to delete an unwanted object that appears momentarily in a clip. Such an object may be removed by revealing through to another frame at a time that the object was not present. The user would load the layer into paint, advance to the first frame in which the object is present, click on reveal 304, enter a frame number corresponding to the frame in which the object is not present and ensure that the lock 314 is enabled. A paint tool may then be used to remove the unwanted object and the user advances to the last frame in which the object is present. Accordingly, the revealed area in the single frame is used on every frame in the clip having the unwanted object.

In yet another example, the user may desire to reveal from one clip to another (e.g., to remove an element that is always present in the scene (e.g., a moving plane). If the user has a second clip shot in front of the same background in which the unwanted object is not present, the second clip shot can be used as the reveal source. To accomplish such a reveal operation, the user imports two layers into a composite and specifies the topmost layer as a target layer and a bottom layer as the reveal source 310. After selecting the top layer, the reveal button 304 is selected and a source image other than the current layer is selected for the reveal operation. The frame number containing the image to reveal is entered in frame field 312 and the lock 314 is enabled to reveal only to the specified frame (lock 314 is disabled if the user desires the revealed source to advance and reverse frames as the clip is advanced). The user can then paint as desired to reveal to the specified source.

While the reveal operation has many uses, the prior art reveal operations have various limitations. For example, to reveal from a source to a target as described above, a source/target clip must first be created and then added to a composite. Accordingly, the user cannot select particular elements from different layers to reveal to. In addition, the user cannot select particular elements on the same layer in a composite to reveal to. Further, once the user selects a particular layer as a source, the user cannot provide further limitations regarding the alpha channel on that layer (e.g., whether the reveal option will maintain the alpha information from the target or source).

In view of the above, what is needed is the ability to conduct a reveal operation while presenting the user with more flexibility and options. Further, what is needed is the ability to perform a paint operation from within a schematic view.

SUMMARY OF THE INVENTION

One or more embodiments of the invention provide the ability to conduct paint operations. More specifically, the invention enables a user to perform a layer-based raster paint operation in a procedural renderer. A user can dynamically perform paint operations in a schematic view without exiting a procedural renderer, using a paint application to create a result clip, importing the result clip into the procedural renderer and proceeding. In this regard, the paint operation behaves similar to a raster pain visually but provides the ability for paint strokes to survive changes in nodes upstream of the paint node.

In other embodiments of the invention, an enhanced reveal paint operation is enabled. When performing a reveal operation in the prior art, a user may paint and reveal the contents of a single composite/layer. Thus, the user was forced to create a composite result clip that the user desired to reveal to. In the present invention, the layers in a composite may be viewed in a stack and individual layers that the user desires to reveal to may be selected/identified dynamically without creating a result composite clip. Thereafter, when conducting a paint operation, the brush stroke or reveal tool reveals to those layers identified/selected by the user. Accordingly, the prior art time consuming task of creating a result clip is not necessary.

An additional feature of the present invention allows the user to determine whether to respect a matte or not when performing either a reveal or a clone operation. During a reveal operation, the user has the option of respecting (i.e., maintaining) the matte/alpha values on the layer being revealed to. For example, as the user reveals a brush stroke over an area identified with a particular alpha value, that value will be maintained. Accordingly, if a matte illustrates such an area to be completely transparent, the reveal operation will not affect the alpha values in such an area. However, if the user elects not to respect the matte, the alpha values are ignored and the reveal operation will reveal the image contents regardless of the alpha transparency values.

When performing a clone operation, the content of one layer is cloned/duplicated/copied to a destination layer. In such a clone operation, the user has the option of respecting the matte in the destination layer (i.e., the layer receiving the cloned content), respecting the matte for the layer being cloned, respecting the mattes in both the layer being cloned and the destination layer, or not respecting any matte/alpha values. Such an option may be presented through a menu (e.g., a pop-up menu).

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 4:
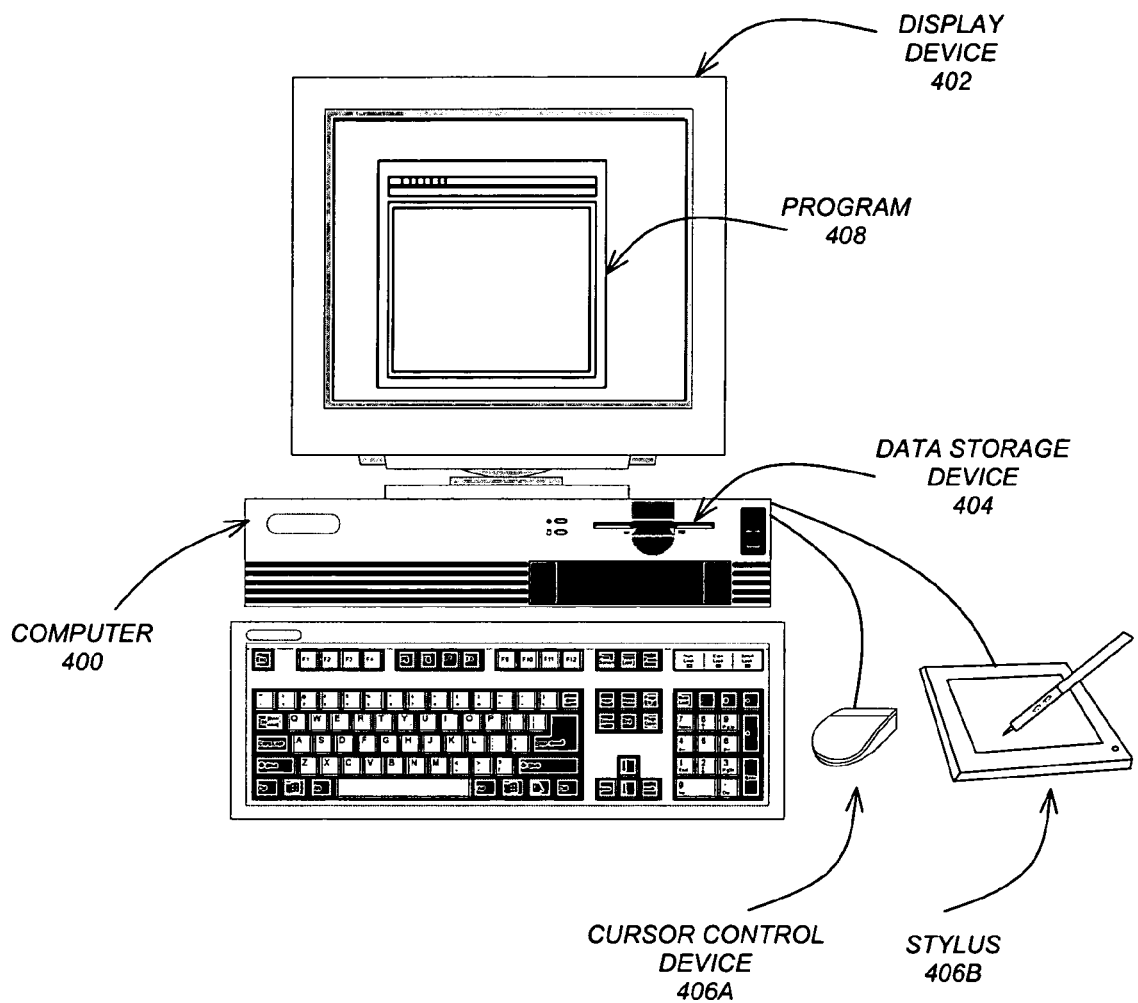
FIG. 4 is an exemplary hardware and software environment used to implement one or more embodiments of the invention.

FIG. 4 is an exemplary hardware and software environment used to implement one or more embodiments of the invention. Embodiments of the invention are typically implemented using a computer 400, which generally includes, inter alia, a display device 402, data storage device(s) 404, cursor control devices 406A, stylus 406B, and other devices. Those skilled in the art will recognize that any combination of the above components, or any number of different components, peripherals, and other devices, may be used with the computer 400.

One or more embodiments of the invention are implemented by a computer-implemented program 408. Such a program may be a paint application, media player, a video editing program, an effects program, compositing application, or any type of program that executes on a computer 400. The program 408 may be represented by a window displayed on the display device 402. Generally, the program 408 comprises logic and/or data embodied in or readable from a device, media, carrier, or signal, e.g., one or more fixed and/or removable data storage devices 404 connected directly or indirectly to the computer 400, one or more remote devices coupled to the computer 400 via a data communications device, etc. In addition, program 408 (or other programs described herein) may be an object-oriented program having objects and methods as understood in the art. Embodiments of the invention may also include an article of manufacture or program storage device that is readable by a computer and that tangibly embodies a program of instructions executable by the computer to perform method steps as described herein.

Figure 5:
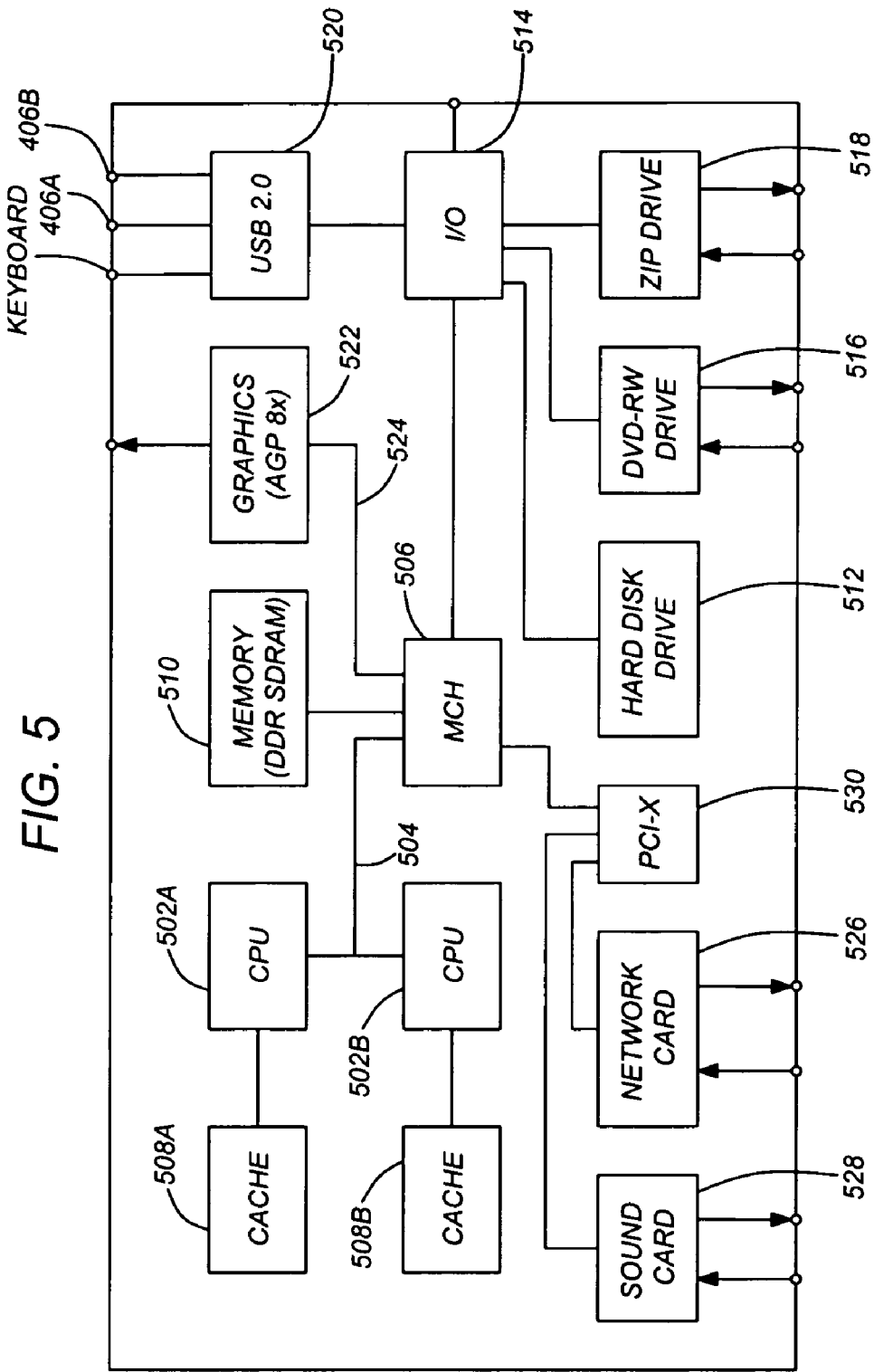
FIG. 5 illustrates the components of a computer system in accordance with one or more embodiments of the invention.

The components of computer system 400 are further detailed in FIG. 5 and, in the preferred embodiment of the present invention, said components are based upon the Intel® E7505 hub-based chipset.

The system 400 includes two Intel® Pentium™ Xeon™ DP central processing units (CPU) 502A, 502B running at three Gigahertz, that fetch and execute instructions and manipulate data via a system bus 504 providing connectivity with a Memory Controller Hub (MCH) 506. CPUs 502A, 502B are configured with respective high-speed caches 508A, 508B comprising at least five hundred and twelve kilobytes, which store frequently-accessed instructions and data to reduce fetching operations from a larger memory 510 via MCH 506. The MCH 506 thus co-ordinates data flow with a larger, dual-channel double-data rate main memory 510, that is between two and four gigabytes in data storage capacity and stores executable programs which, along with data, are received via said bus 504 from a hard disk drive 512 providing non-volatile bulk storage of instructions and data via an Input/Output Controller Hub (ICH) 514. The I/O hub 514 similarly provides connectivity to DVD-ROM read-writer 516 and ZIP™ drive 518, both of which read and write data and instructions from and to removable data storage media. Finally, I/O hub 514 provides connectivity to USB 2.0 input/output sockets 520, to which the stylus and tablet 406B combination, keyboard, and mouse 406A are connected, all of which send user input data to system 400.

A graphics card 522 receives graphics data from CPUs 502A, 502B along with graphics instructions via MCH 506. The graphics card 522 may be coupled to the MCH 506 through a direct port 524, such as the direct-attached advanced graphics port 8X (AGP 8X) promulgated by the Intel® Corporation, the bandwidth of which exceeds the bandwidth of bus 504. The graphics card 522 may also include substantial dedicated graphical processing capabilities, so that the CPUs 502A, 502B are not burdened with computationally intensive tasks for which they are not optimized.

Network card 526 provides connectivity to a framestore by processing a plurality of communication protocols, for instance a communication protocol suitable to encode and send and/or receive and decode packets of data over a Gigabit-Ethernet local area network. A sound card 528 is provided which receives sound data from the CPUs 502A, 502B along with sound processing instructions, in a manner similar to graphics card 522. The sound card 528 may also include substantial dedicated digital sound processing capabilities, so that the CPUs 502A, 502B are not burdened with computationally intensive tasks for which they are not optimized. Network card 526 and sound card 528 may exchange data with CPUs 502A, 502B over system bus 504 by means of Intel®'s PCI-X controller hub 530 administered by MCH 506.

Those skilled in the art will recognize that the exemplary environment illustrated in FIGS. 4 and 5 are not intended to limit the present invention. Indeed, those skilled in the art will recognize that other alternative environments may be used without departing from the scope of the present invention.

Software Environment

Figure 1:
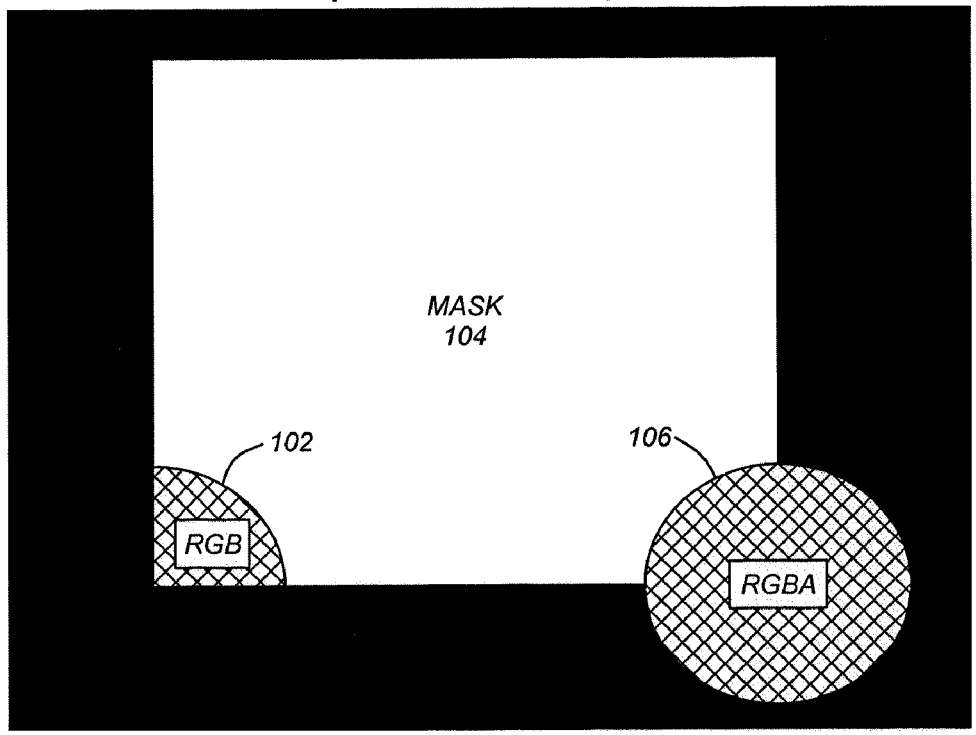
FIG. 1 illustrates a mask and varying alpha values.
Figure 3:
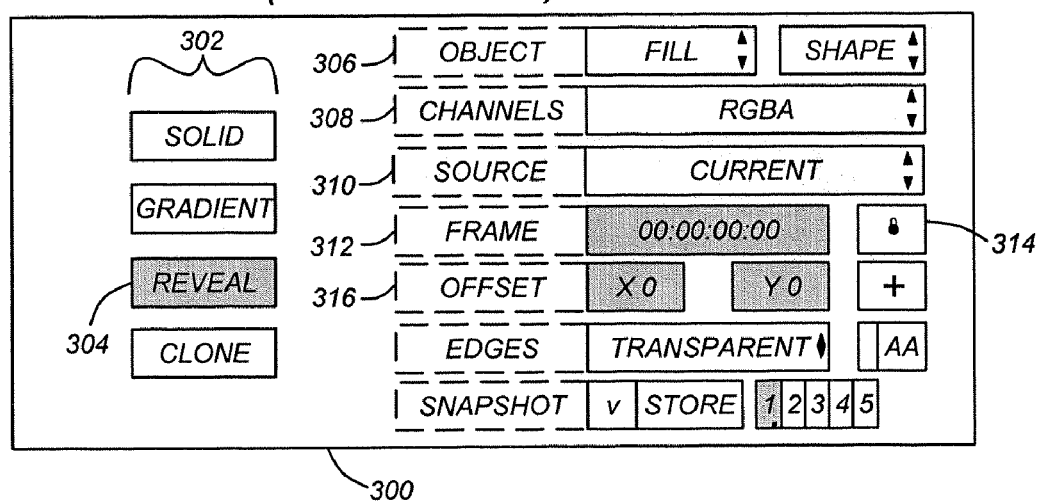
FIG. 3 illustrates a dialog window indicating the various settings for a reveal operation.
Figure 2:
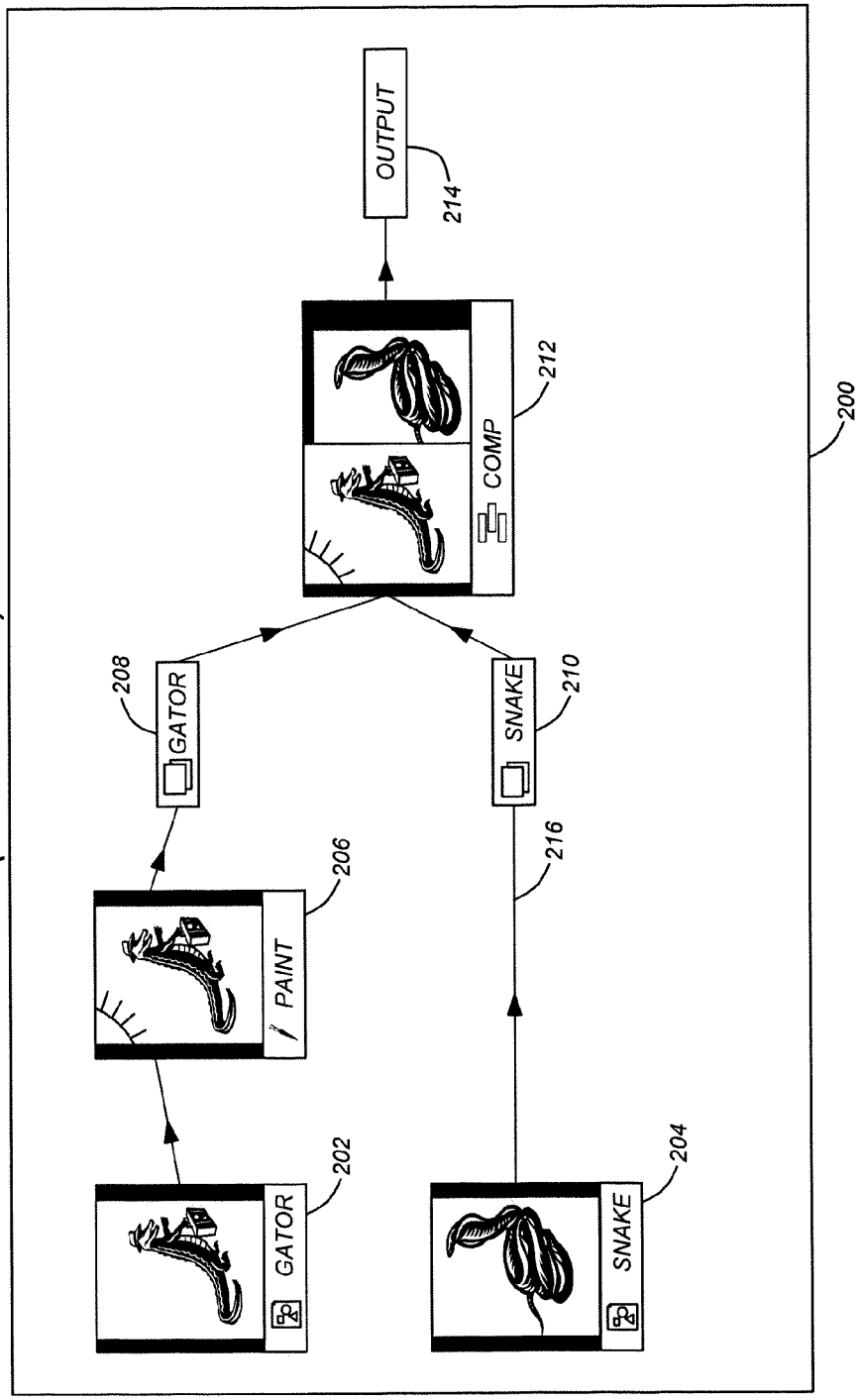
FIG. 2 illustrates a process tree in a schematic view.

As described above, a software application 408 such as a paint application may execute on computer 400. Alternatively, the software application 408 may comprise a procedural renderer that permits the viewing of the different paint operations schematically (as in FIG. 2).

When working in the schematic view 200, users may modify the process tree and individual nodes prior to producing the output 214. When the user is ready to generate a final clip or an intermediate result, the user selects a process button (not shown). Once selected, all process trees in the schematic 200 are processed and one clip is written to the destination specified by each output node 214. The process of generating the final clip or intermediate result is referred to as rendering. Accordingly, the schematic view 200 may also be referred to as a procedural renderer.

In one or more embodiments, paint operations may be performed in both a standard paint application and from within the procedural renderer 200. When painting from within the procedural renderer 200, the Paint application may be referred to as Batch Paint (an application available from the assignee of the present invention). Batch Paint may be useful when the user desires to paint on different layers, or when the user desires to add painting as a step within a process tree. By adding a paint node 206 to a process tree from Batch Paint, the user can easily touch up a clip before processing the clip (e.g., in another module or before producing the result clip at output node 214).

There are two primary methods of altering the appearance of clips in Batch Paint: (1) Paint tools may be used on individual layers or (2) layer options may be edited to affect the appearance of layers in relation to one another. Under either method, the painting is conducted upon a selected layer. Thus, the user may be required to add a layer to initiate a paint operation.

With the Paint tools, users can paint, reveal, and clone strokes. Brush settings may also be modified to change the effect of a Paint tool.

With the layer options, effects can be created by combining different layers together and changing the order of layers. Additionally, the appearance of a clip may be changed by hiding layers. In one or more embodiments, paint operations may only be performed on the front or matte layers. Accordingly, white, black, or grey may be painted on the matte to influence which parts of the layer are opaque or transparent. The matte (or inverse matte) may be used for a layer and its strokes.

Strokes may also be isolated from each other. Isolating strokes is useful, for example, to hide a stroke in one version of a clip and show it in another. To animate paint strokes, a paint module outside of Batch Paint may be used.

To begin painting in Batch Paint, a paint node 206 may be dragged into the schematic view 200. In this regard, a menu bar or list of available operations may be displayed surrounding the schematic view 200 to allow the user to invoke various operations. Once the paint node 206 is in the schematic view 200, the user may click the paint node to display a Batch Paint menu that provides the various painting options.

Figure 6:
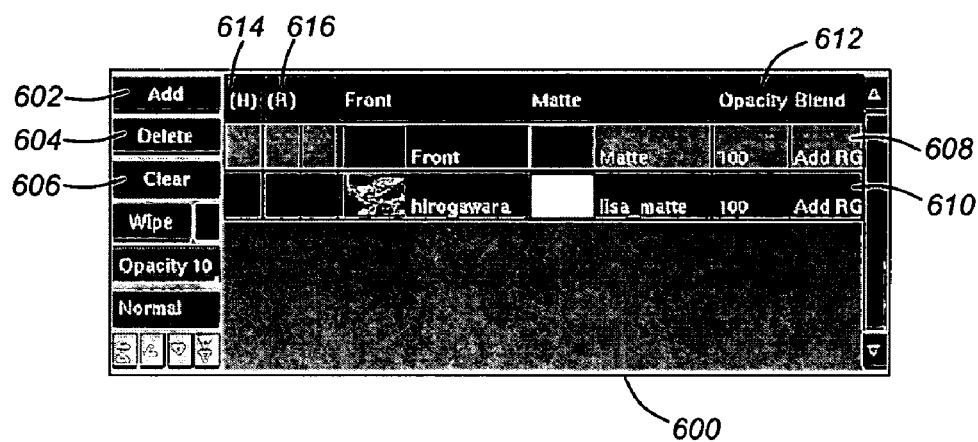
FIG. 6 illustrates a layer menu that may be used to manipulate layers in accordance with one or more embodiments of the invention.

As described above, to paint in Batch Paint, a layer is needed. FIG. 6 illustrates a layer menu that may be used to manipulate layers in accordance with one or more embodiments of the invention. By selecting various buttons 602-606 within layer menu 600, users may add 602 a layer, delete 604 a layer, or clear 606 a layer. Additionally, users can add an image as a layer.

Each layer is displayed as a row 608-610 in a layers list of the layer menu 600. The layer 608 at the top of the layers list is also on the top of the stack on the canvas (workspace). The order of layers may be modified to move certain objects to the front of the clip and others behind. When a new layer is added, it is added to the top of the stack. Thereafter, the new layer can be positioned behind existing layers. To add an image as a layer, a layer is first added and then the image is connected to the new layer (e.g., as either the front or matte).

The opacity may be independently established for each layer 608-610. By changing the transparency of a layer, the user can make the contents of the underlying layers show through. By altering the transparency of layers (e.g., by specifying a value between 0 and 100 in the layer opacity field 612 for the desired layer), the appearance of the clip may be modified without affecting the front and matte clips for the layers.

Hide column 614 may be used to hide one or more selected layers. When a layer is hidden, it will not be processed when the user selects the "process" button from the schematic view 200. Thus, to compare different versions of a clip, the user can hide a layer, process the clip, and then show the same layer and process the clip a second time for a different result. To hide a layer, the hide column 614 for a particular layer is selected thereby causing a check mark to appear in the hide column 614 for each layer that is hidden.

In accordance with one or more embodiments, strokes may be painted on a selected layer within Batch Paint using available brush types and colors. Thus, the user of layers in Batch Paint simulate painting in the schematic view 200. In this regard, the painting is performed on the buffer for Batch Paint prior to the processing/rendering of the image. Such capabilities to perform a paint operation in a procedural renderer context is not available in the prior art.

In addition, the invention provides the illusion of modifying the source image by behaving exactly as a raster paint visually (i.e., paint strokes appear as if the input buffer is being directly modified instead of being painted on a layer), but strokes are actually stored on an invisible (to the user) layer. Accordingly, paint strokes survive changes in nodes upstream of the paint node. In this regard, no procedural rendering application with a paint node, has a layer-based raster paint node. Instead, the prior art merely provides pure raster paint operations which are destructive.

Reveal Operation

One or more embodiments of the invention also provide the ability to use the reveal paint operation in combination with different layers and the layer menu 600. As described above, a reveal tool may be used to reveal the contents of a layer using a brush stroke. The present invention provides the ability to determine which layers are to be revealed when a reveal operation is conducted. Accordingly, a user can reveal the contents of as many (or as few) layers as desired. When a reveal paint operation is conducted, the brush shows the contents of all revealed layers at that position.

The ability to determine which layers are to be revealed is conducted using the layer menu (also referred to as the reveal stack). To select a particular layer to be revealed during a reveal paint operation, the user clicks the reveal column 616 in the layers list for the layer to be revealed. Layers with a check mark displayed in the reveal column 616 are revealed.

In view of the above, the present invention enables the ability to reveal multiple layers. In this regard, the reveal operation may be to a composite of multiple layers. Such multiple layer reveal capabilities are distinguishable from the prior art which restricted a reveal operation to a single layer. Further, the user can determine which layers are included in such a composite in real time. Such real time capabilities are distinguishable from the prior art that required the creation of a separate result clip (consisting of all of the desired layers into a composite result clip) and loading of the result clip into a paint buffer in order to conduct a reveal to the result clip.

In view of the above, the present invention enables the use of the traditional reveal settings (e.g., X offset, Y offset, time offset) with the added benefit of the ability to select multiple layers. Such multiple layer selections operate using the buffer for Batch Paint and therefore do not require extensive processing prior to rendering the output 214.

In addition to the ability to select particular layers for use in a reveal operation, the present invention provides an option that allows the user to determine whether to respect the alpha/matte layer or not. Such a feature is referred to as a "hold-out" feature. The hold-out feature may be used when conducting a reveal paint operation or a cloning operation (i.e., if the user is cloning or duplicating an existing stroke).

If the holdout feature is enabled when conducting a reveal operation, the contents of the selected layers are revealed limited by the matte layer. In other words, the user has the option of whether to utilize the alpha values in the matte, or to ignore the alpha values in the matte when performing a reveal operation.

The hold-out feature is enabled based on various factors. One such factor is that the image and matte (i.e., alpha values) are pre-multiplied. In other words, if an image is filmed on a green screen and the matte is white for the image and black for the remainder of the image, if the user views an image with a black background, the image has been pre-multiplied by the alpha values so that the user views the image through the matte with the black background.

Figure 7:
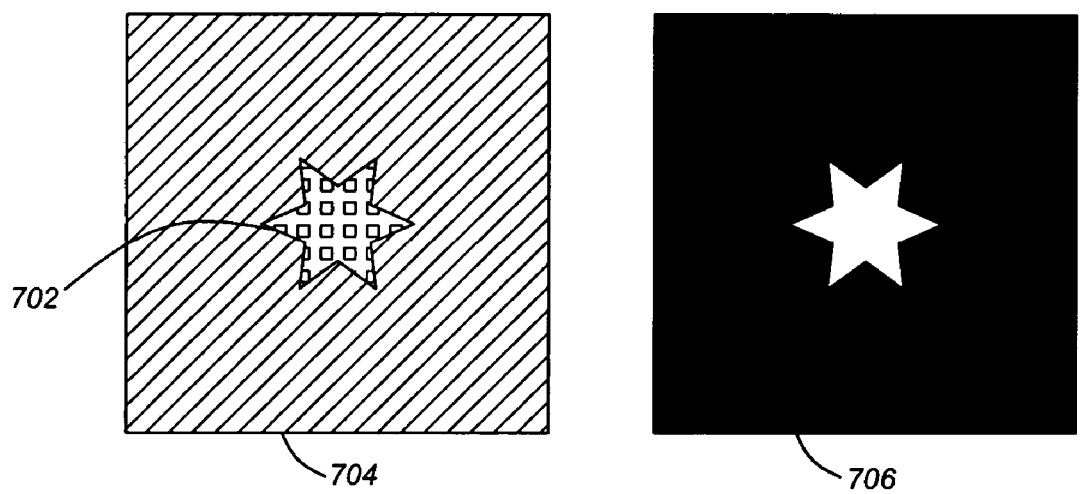
FIG. 7 illustrates the use of a matte in accordance with one or more embodiments of the invention.

When performing a reveal operation with the hold-out active, the matte is respected. FIG. 7 illustrates the use of a matte in accordance with one or more embodiments of the invention. As illustrated, a star image 702 is filmed on a green background 704 (wherein the green is illustrated in FIG. 7 by a diagonal fill pattern). The matte 706 for the image reflects the star image 702 in white with the background black. The matte 706 for the image provides that everything but the star image 702 is transparent. If the hold-out feature is active, thereby causing the matte 706 to be respected, only the star image 702 will appear during a reveal operation. In this regard, if the reveal paint operation extends beyond the star image 702 into the background 704, the matte is respected such that the reveal operation will not reveal any of the background. Thus, none of the green 704 is transferred.

Alternatively, the user can also elect to not respect the matte by not activating the hold-out feature. If the matte is not respected, when the reveal paint operation is conducted, as the reveal paint extends into the green background 704, the green background will be revealed.

In yet another embodiment, the user has the option of respecting or not respecting the image 702. Further, the invention provides the ability for the user to respect (1) the input matte; (2) just strokes; (3) the input matte and the strokes; or (4) none. In other words, the user can elect to use the (1) layer/matte; (2) layer strokes; (3) both; or (4) neither. Such options may be presented to the user via a pop-up menu or other dialog box.

An example of such use is if a paint stroke is cloned/duplicated. Such stroke cloning relies on the premise that rather than adding an existing stroke to a layer (as in the prior art), the present invention allows users to draw directly on/in the layer. The stroke being drawn may have it's own alpha/matte associated with it. Using the hold-out feature, the user has the option of using the alpha/matte from the layer itself, using the alpha/matte for the stroke being cloned/drawn, using the alpha/matte for both the layer and stroke, or using no alpha/matte. Thus, the hold-out feature present the user with multiple options relating to the alpha/matte.

Logical Flow

Figure 8:
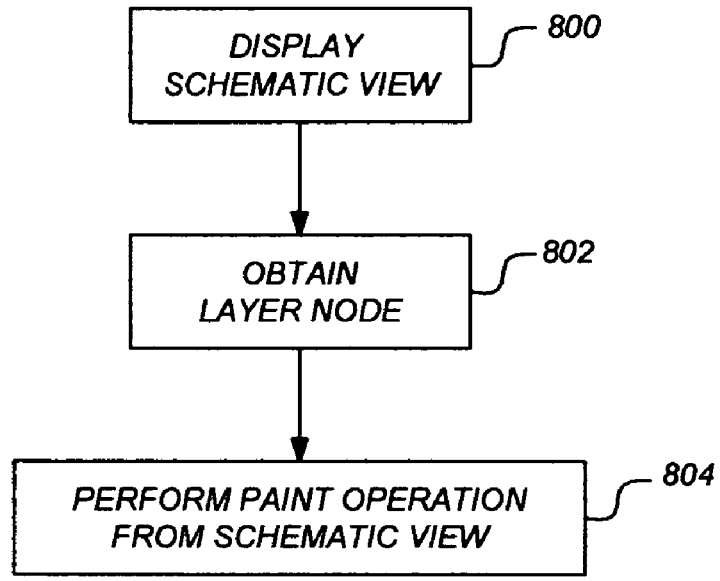
FIG. 8 is a flowchart illustrating the process for performing a paint operation from within a procedural renderer in accordance with one or more embodiments of the invention.
Figure 9:
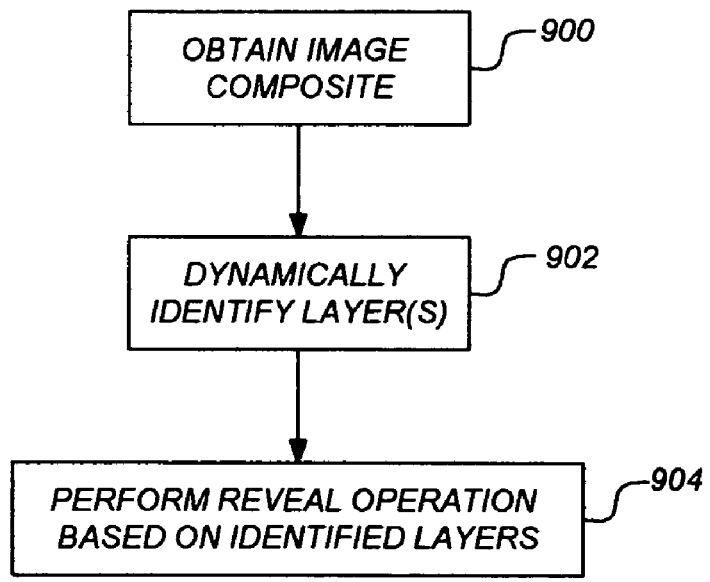
FIG. 9 is a flowchart illustrating the process for conducting a reveal paint operation in accordance with one or more embodiments of the invention.

The above description sets forth the various features available in accordance with the invention. FIGS. 8 and 9 set forth the logical flow for implementing methods in accordance with one or more embodiments of the invention.

FIG. 8 is a flowchart illustrating the process for performing a paint operation from within a procedural renderer in accordance with one or more embodiments of the invention. At step 800, a schematic view of a flow of clip image data is displayed. In the schematic view, one or more nodes each represent an operator performed on a particular layer of the clip image data. Further, lines between/connecting two or more nodes indicate the flow of the clip image data between the operators.

At step 802, a layer node is obtained in the schematic view. In this regard, a layer node may be added, duplicated, imported, etc. The layer node is used for a paint operator comprising a paint operation performed on the clip image data. Accordingly, once a layer node is present in the schematic view, a paint operation is created, assigned, or imported into the layer node. At step 804, a paint operation is performed using the layer node in the schematic view. Such a paint operation is performed without processing the operators for each node in the schematic view. For example, the paint operation may be performed or may appear to be performed in a buffer for the schematic view. In this regard, the brush/paint stroke may be painted onto an invisible (to the user) layer instead of being directly modifying the input buffer. Additionally, the paint operation may comprise a brush/paint stroke directly onto the layer instead of a stroke being added to the layer. Thus, the user may be unaware of the layer based operation but receives the benefit in the form of the survival of changes in upstream nodes.

FIG. 9 is a low chart illustrating the process for conducting a reveal paint operation in accordance with one or more embodiments of the invention. At step 900, an image composite comprising multiple layers is obtained in a paint application.

Thereafter, at step 902, the paint application allows the user to dynamically identify one or more of the layers to be used in a reveal operation. Such a dynamic identification may be performed through a layer menu that lists each of the layers in the image composite. Further, to allow expedited processing, the identification of the particular layers is performed through a buffer of the paint application. Accordingly, the user does not need to first create a composite result clip containing those layers that the user desires to reveal prior to actually performing the reveal operation.

At step 904, the reveal paint operation is conducted using a reveal tool that reveals contents of the one or more identified layers at a position where the reveal tool is used. For example, the reveal tool may comprise a brush that performs a brush stroke revealing the selected layers where the user strokes the brush on the screen.

In addition to the above, the dynamic determination performed at step 902 may also allow the user to determine whether to respect a matte during a reveal operation. Such an action provides that if the matte layer is respected, the reveal paint operation will utilize alpha values from the matte layer. Alternatively, the matte layer is not respected, the reveal paint operation will not utilize alpha values from the matte layer. Instead, no alpha values will be used and the matte will be ignored.

The present invention also provides the ability to respect/not respect the matte when conducting a clone operation at step 906. A clone operation clones/copies/duplicates the contents of a selected layer. When cloning the contents, the user has the option of using the hold-out option to respect or not respect various mattes. In this regard, the user can use the alpha values from the matte layer that the selected layer is being cloned onto, alpha values from the selected layer that is being cloned (i.e., the stroke or image that is being cloned), alpha values for both the matte layer and the selected layer, or to not utilize any alpha values. Such a hold-out option provides considerable flexibility to the user regarding the alpha values.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for conducting a paint operation comprising:
  (a) displaying, on a display device, a schematic view of a flow of clip image data, wherein:
    (i) one or more nodes in the schematic view each represent an operator performed on a particular layer of the clip image data;
    (ii) a line between two or more nodes indicate the flow of clip image data between the operators;
  (b) obtaining a layer node comprising a paint operator in the schematic view, wherein the paint operator comprises a paint operation performed on the clip image data; and
  (c) utilizing the layer node to perform a paint operation in the schematic view without processing the operators associated with each node in the schematic view.

2. The method of claim 1 wherein the paint operation comprises a paint stroke.

3. A computer-implemented method for conducting a reveal paint operation comprising:
  (a) obtaining, in a paint application, an image composite comprising multiple layers;
  (b) dynamically identifying, in the paint application, one or more of the multiple layers to be used in a reveal operation; and
  (c) performing a reveal paint operation wherein a reveal tool is used to reveal contents of the one or more identified layers at a position where the reveal tool is used.

4. The method of claim 3, wherein the reveal tool comprises a brush that performs a brush stroke.

5. The method of claim 3, wherein the one or more layers are identified using a layer menu that lists each of the layers in the image composite.

6. The method of claim 3, wherein the dynamic identifying is performed through a buffer of the paint application.

7. The method of claim 3, further comprising dynamically determining, within the paint application, whether a matte layer will be respected while performing the reveal paint operation, wherein:
  if the matte layer is respected, the reveal paint operation will utilize alpha values from the matte layer; and
  if the matte layer is not respected, the reveal paint operation will not utilize alpha values from the matte layer.

8. The method of claim 3, further comprising conducting a clone operation that clones contents of a selected layer, wherein during the clone operation, the paint application dynamically determines whether to use alpha values from a matte layer, alpha values for the selected layer, alpha values for both the matte layer and the selected layer, or to not utilize any alpha values.

9. A computer implemented system for conducting a paint operation comprising:
(a) a computer having a memory;
(b) a display device;
(c) a procedural renderer executing on the computer, wherein the procedural renderer is configured to:
(i) display, on display device, a schematic view of a flow of clip image data, wherein:
(1) one or more nodes in the schematic view each represent an operator performed on a particular layer of the clip image data;
(2) a line between two or more nodes indicate the flow of clip image data between the operators;
(ii) obtain a layer node comprising a paint operator in the schematic view, wherein the paint operator comprises a paint operation performed on the clip image data; and
(iii) utilize the layer node to perform a paint operation in the schematic view without processing the operators associated with each node in the schematic view.

10. The system of claim 9 wherein the paint operation comprises a paint stroke.

11. A computer-implemented system for conducting a reveal paint operation comprising:
(a) a computer having a memory;
(b) a computer application executing on the computer, wherein the computer application is configured to:
(i) obtain, in a paint application communicatively coupled to the computer application, an image composite comprising multiple layers;
(b) dynamically identify, in the paint application, one or more of the multiple layers to be used in a reveal operation; and
(c) perform a reveal paint operation wherein a reveal tool is used to reveal contents of the one or more identified layers at a position where the reveal tool is used.

12. The system of claim 11, wherein the reveal tool comprises a brush that performs a brush stroke.

13. The system of claim 11, wherein the one or more layers are identified using a layer menu that lists each of the layers in the image composite.

14. The system of claim 11, wherein the dynamic identifying is performed through a buffer of the paint application.

15. The system of claim 11, wherein the computer application is further configured to dynamically determine, within the paint application, whether a matte layer will be respected while performing the reveal paint operation, wherein:
if the matte layer is respected, the reveal paint operation will utilize alpha values from the matte layer; and
if the matte layer is not respected, the reveal paint operation will not utilize alpha values from the matte layer.

16. The system of claim 11, wherein the computer application is further configured to conduct a clone operation that clones contents of a selected layer, wherein during the clone operation, the paint application dynamically determines whether to use alpha values from a matte layer, alpha values for the selected layer, alpha values for both the matte layer and the selected layer, or to not utilize any alpha values.

17. A program storage device, readable by a computer, including at least one program of instructions executable by the computer to perform method steps of conducting a paint operation, the method steps comprising the steps of:
(a) displaying, on a display device, a schematic view of a flow of clip image data, wherein:
(i) one or more nodes in the schematic view each represent an operator performed on a particular layer of the clip image data;
(ii) a line between two or more nodes indicate the flow of clip image data between the operators;
(b) obtaining a layer node comprising a paint operator in the schematic view, wherein the paint operator comprises a paint operation performed on the clip image data; and
(c) utilizing the layer node to perform a paint operation in the schematic view without processing the operators associated with each node in the schematic view.

18. The program storage device of claim 17 wherein the paint operation comprises a paint stroke.

19. A program storage device, readable by a computer, including at least one program of instructions executable by the computer to perform method steps of conducting a reveal paint operation, the method steps comprising the steps of:
(a) obtaining, in a paint application, an image composite comprising multiple layers;
(b) dynamically identifying, in the paint application, one or more of the multiple layers to be used in a reveal operation; and
(c) performing a reveal paint operation wherein a reveal tool is used to reveal contents of the one or more identified layers at a position where the reveal tool is used.

20. The program storage device of claim 19, wherein the reveal tool comprises a brush that performs a brush stroke.

21. The program storage device of claim 19, wherein the one or more layers are identified using a layer menu that lists each of the layers in the image composite.

22. The program storage device of claim 19, wherein the dynamic identifying is performed through a buffer of the paint application.

23. The program storage device of claim 19, wherein the method steps further comprise dynamically determining, within the paint application, whether a matte layer will be respected while performing the reveal paint operation, wherein:
if the matte layer is respected, the reveal paint operation will utilize alpha values from the matte layer; and
if the matte layer is not respected, the reveal paint operation will not utilize alpha values from the matte layer.

24. The program storage device of claim 19, wherein the method steps further comprise conducting a clone operation that clones contents of a selected layer, wherein during the clone operation, the paint application dynamically determines whether to use alpha values from a matte layer, alpha values for the selected layer, alpha values for both the matte layer and the selected layer, or to not utilize any alpha values.

* * * * *